United States Patent [19]
Hashimoto et al.

[11] Patent Number: 5,453,650
[45] Date of Patent: Sep. 26, 1995

[54] FACE OPPOSING TYPE MOTOR

[75] Inventors: Yoshio Hashimoto, Tokyo; Mitsuo Suzuki, Kita; Yukio Itami, Yokohama; Yoshihiro Takahashi, Shibata, all of Japan

[73] Assignees: Ricoh Company, Ltd., Tokyo; Tohoku Ricoh Co., Ltd., Miyagi, both of Japan

[21] Appl. No.: 54,234

[22] Filed: Apr. 30, 1993

[30]  Foreign Application Priority Data

May 8, 1992 [JP] Japan ................... 4-115101

[51] Int. Cl.⁶ ..................... F16C 32/06; G02B 26/08
[52] U.S. Cl. ................... 310/268; 310/42; 310/67 R; 310/90.5
[58] Field of Search ................... 310/42, 67 R, 310/90, 90.5, 156, 262, 267, 268

[56]  References Cited

U.S. PATENT DOCUMENTS

| | | | |
|---|---|---|---|
| 4,658,312 | 4/1987 | Elsässer et al. | 360/97 |
| 4,726,640 | 2/1988 | Iwama et al. | 350/6.8 |
| 4,893,044 | 1/1990 | Bush et al. | 310/261 |
| 5,103,335 | 4/1992 | Sugiura | 359/212 |
| 5,114,245 | 5/1992 | Tanaka et al. | 384/112 |
| 5,224,782 | 7/1993 | Miwa et al. | 384/100 |

*Primary Examiner*—Thomas M. Dougherty
*Assistant Examiner*—D. R. Haszko
*Attorney, Agent, or Firm*—Oblon, Spivak, McClelland, Maier & Neustadt

[57] ABSTRACT

A face opposing type motor has a rotor yoke fixed to a hollow rotating shaft disposed in a non-contact bearing device; the non-contact bearing device having a fixed shaft inserted into the hollow rotating shaft; a rotor magnet held by the rotor yoke; and a driving coil substrate having a face opposed to the rotor magnet. The rotor yoke has a rotor magnet fitting portion fitted to an outer circumferential face of the rotor magnet so as to hold the rotor magnet by this rotor magnet fitting portion. In accordance with such a structure, it is possible to provide a reliable face opposing type motor having an excellent quality and cheaply manufactured by improving a system for holding a rotor magnet.

11 Claims, 4 Drawing Sheets

FACE OPPOSING TYPE MOTOR

BACKGROUND OF THE INVENTION

1. Field of the Invention

The present invention relates to a face opposing type motor used in a device rotated at a high speed. More particularly, the present invention relates to a face opposing type motor in which an accuracy in rotation of the motor and reliability of the motor are improved and manufacturing cost of the motor is reduced.

2. Description of the Related Art

A face opposing type motor is generally used in many cases to make various kinds of products compact and especially thin.

In such a general face opposing type motor, an aluminum alloy is used for a flange to reduce inertial force of rotation. Accordingly, a coefficient of thermal expansion of the flange is large and a coefficient of thermal expansion of a rotor magnet is greater than that of the above aluminum alloy. Therefore, when a polygon scanner using this motor is continuously operated, the rotor magnet is expanded in a diametrical direction thereof by an increase in temperature of the rotor magnet and centrifugal force of the rotor magnet so that the rotation of a rotating body is gradually unbalanced and an accuracy in rotation of the rotating body is reduced.

Further, a center of gravity of the rotating body is located in a position from an approximately central position of a dynamic pressure air radial bearing to a free end of a fixed shaft. Therefore, the rotation of the rotating body tends to be influenced by vibration of the fixed shaft so that the rotation of the rotating body is vibrated by the vibration of the fixed shaft, thereby reducing an accuracy in rotation of the rotating body.

The fixed shaft is fixed by shrinkage fit to a housing to which a casing is fitted. Namely, a dimensional tolerance for an inclination of the fixed shaft is strict with respect to an attaching reference face of the casing and a window for deflection. However, the attaching reference face and the window for deflection are fixed to the fixed shaft through the housing. Therefore, it is difficult to precisely distribute the dimensional tolerance to the reference face and the window so that an accuracy in processing of each of parts is strict and cost of the motor is increased.

SUMMARY OF THE INVENTION

It is therefore an object of the present invention to provide a reliable face opposing type motor for preventing an accuracy in rotation thereof caused by thermal expansion from being reduced by improving a system for holding a rotor magnet and restraining expansion of the rotor magnet caused at a continuous operating time of the motor.

Another object of the present invention is to provide a face opposing type motor in which no rotation of a rotating body is easily influenced by the vibration of a fixed shaft so that cost of the motor is reduced.

In accordance with a first structure of the present invention, the above objects can be achieved by a face opposing type motor comprising a rotor yoke fixed to a hollow rotating shaft disposed in a non-contact bearing device; the non-contact bearing device having a fixed shaft inserted into the hollow rotating shaft; a rotor magnet held by the rotor yoke; and a driving coil substrate having a face opposed to the rotor magnet; the rotor yoke having a rotor magnet fitting portion fitted to an outer circumferential face of the rotor magnet so as to hold the rotor magnet by this rotor magnet fitting portion.

In accordance with a second structure of the present invention, the outer circumferential face of the rotor magnet is completely covered with the rotor yoke.

In accordance with a third structure of the present invention, the non-contact bearing device has recessed and projected portions for generating a dynamic pressure and formed in one of the fixed shaft and the hollow rotating shaft, and a center of gravity of a rotating body including the hollow rotating shaft is located in a position from an approximately central position of the recessed and projected portions to a fixed end of the fixed shaft in an axial direction of the fixed shaft.

In accordance with a fourth structure of the present invention, the non-contact bearing device has a magnetic thrust bearing arranged on the side of a housing attaching the driving coil substrate thereto, and one end of the fixed shaft is fixed to a casing for housing the rotating body in combination with the housing.

In accordance with a fifth structure of the present invention, intermittent projected portions for correcting an unbalanced portion of the rotor yoke are integrally formed in an outer circumferential portion of the rotor yoke in a circumferential direction thereof such that the projected portions are projected onto a yoke face opposite to a yoke face facing the rotor magnet.

In accordance with a sixth structure of the present invention, the rotor yoke is made of stainless steel as an iron or magnetic material and the rotor magnet is formed by a plastic magnet.

As mentioned above, in the first structure of the present invention, the rotor magnet fitting portion of the rotor yoke is fitted to an outer circumferential face of the rotor magnet. Accordingly, it is possible to restrain the rotor magnet from being expanded in a diametrical direction thereof by an increase in temperature of the rotor magnet and centrifugal force of the rotor magnet when the motor is continuously operated. Therefore, an accuracy in rotation of the face opposing type motor can be improved. Further, a general flange for fixing the rotor magnet thereto can be omitted by fixing the rotor magnet using the rotor yoke so that the number of parts can be reduced and manufacturing cost of the motor can be thereby reduced.

In the second structure of the present invention, the outer circumferential face of the rotor magnet is completely covered with the rotor yoke constructed by a magnetic material. Accordingly, it is possible to prevent magnetic fluxes from being leaked to the casing and the housing so that an eddy current loss caused by a rotating magnetic field of the rotor magnet can be reduced. Therefore, driving efficiency of the face opposing type motor can be improved.

In the third structure of the present invention, a center of gravity of the rotating body is located in a position from an approximately central position of recessed and projected portions for generating a dynamic pressure to a fixed end of the fixed shaft. Accordingly, the influence of vibration of the fixed shaft on rotation of the rotating body is reduced so that a vibrational rotation of the rotating body caused by the vibration of the fixed shaft can be restrained. Therefore, it is possible to improve an accuracy in rotation of the face opposing type motor.

In the fourth structure of the present invention, the magnetic thrust bearing is fixed to the housing attaching the driving coil substrate thereto and the fixed shaft is fixed to the casing having the attaching reference face or the window for deflection. Accordingly, accumulative errors in processing and assembly accuracies of the motor can be reduced so that a dimensional tolerance of parts is relaxed. Therefore, manufacturing cost of the face opposing type motor is reduced and a quality of the face opposing type motor is improved.

In the fifth structure of the present invention, projected portions for correcting an unbalanced portion of the rotor yoke are integrally formed with an outer circumferential portion of the rotor yoke so that the projected portions can be easily processed, thereby reducing manufacturing cost of the face opposing type motor.

In the sixth structure of the present invention, the rotor yoke is made of stainless steel as an iron or magnetic material and the rotor magnet is constructed by a plastic magnet. The rotor yoke is formed by a material having a coefficient of thermal expansion smaller than that of the rotor magnet so that it is possible to reliably restrain the rotor magnet from being expanded by the rotor yoke. Accordingly, it is possible to improve an accuracy in rotation of the face opposing type motor. Further, when the rotor yoke is made of stainless steel as a magnetic material, rust preventive processing can be omitted so that manufacturing cost of the face opposing type motor can be reduced.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a face opposing type motor in the present invention will next be described in detail with reference to the accompanying drawings.

Figure 1:
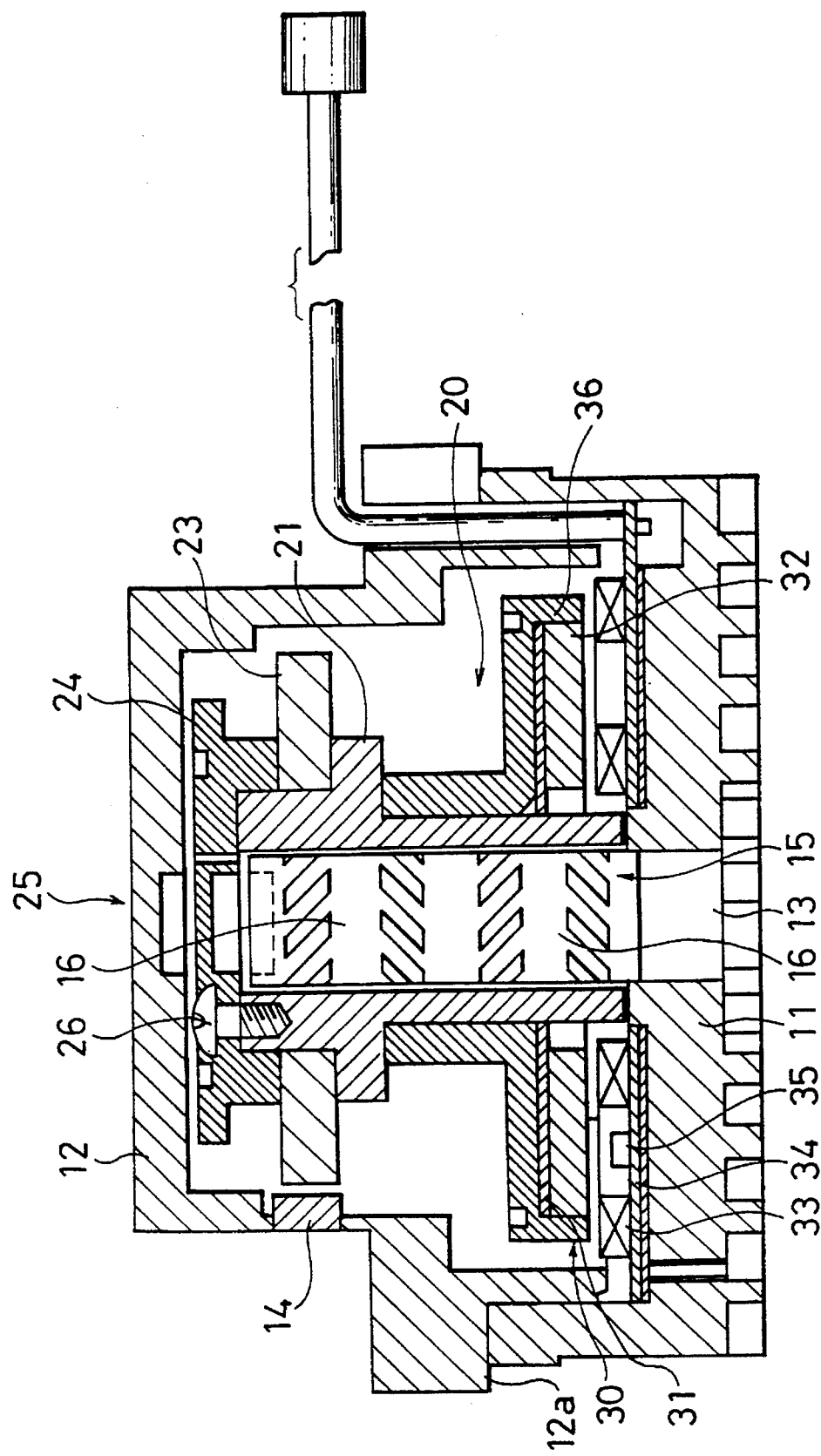
FIG. 1 is a cross-sectional view showing an example of a general face opposing type motor.

For example, a face opposing type motor is generally used in a polygon scanner shown in FIG. 1. In FIG. 1, a fixed shaft 13 having a herringbone-shaped groove 16 is fixed to a housing 11. A hollow rotating shaft 21 is arranged around this fixed shaft 13 to construct a dynamic pressure air radial bearing 15. A rotating body 20 is constructed by the hollow rotating shaft 21, a polygon mirror 23, a mirror presser 24, an attaching screw 26, a flange 36, a rotor yoke 31 and a rotor magnet 32. The rotating body 20 is supported by a casing 12 and a magnetic thrust bearing 25 in an axial direction of the rotating body. The casing 12 has a reference face 12a for attaching the rotating body 20 to an unillustrated optical system. The casing 12 also has a window 14 for deflection. The magnetic thrust bearing 25 has a repulsion type sandwich structure using a permanent magnet.

In a face opposing type motor 30, the rotor yoke 31 and the rotor magnet 32 are attached to a lower portion of the flange 36 fixed to the hollow rotating shaft 21. A driving coil substrate 33, a stator yoke 34 and a Hall element 35 are attached to the housing 11. In this face opposing type motor 30, the rotating body 20 can be rotated by rotating the rotor magnet 32 by an unillustrated driver portion disposed in the driving coil substrate 33.

In such a general face opposing type motor 30, an aluminum alloy is used for the flange 36 to reduce inertial force of rotation. Accordingly, a coefficient of thermal expansion of the flange 36 is large and a coefficient of thermal expansion of the rotor magnet 32 is greater than that of the above aluminum alloy. Therefore, when the polygon scanner is continuously operated, the rotor magnet 32 is expanded in a diametrical direction thereof by an increase in temperature of the rotor magnet and centrifugal force of the rotor magnet so that the rotation of the rotating body 20 is gradually unbalanced and an accuracy in rotation of the rotating body 20 is reduced.

Further, a center of gravity of the rotating body 20 is located in a position from an approximately central position of the dynamic pressure air radial bearing 15 to a free end of the fixed shaft 13. Therefore, the rotation of the rotating body 20 tends to be influenced by vibration of the fixed shaft 13 so that the rotation of the rotating body 20 is vibrated by the vibration of the fixed shaft 13, thereby reducing an accuracy in rotation of the rotating body 20.

The fixed shaft 13 is fixed by shrinkage fit to the housing 11 to which the casing 12 is fitted. Namely, a dimensional tolerance for an inclination of the fixed shaft 13 is strict with respect to the attaching reference face 12a of the casing 12 and the window 14 for deflection. However, the attaching reference face 12a and the window 14 for deflection are fixed to the fixed shaft 13 through the housing 11. Therefore, it is difficult to precisely distribute the dimensional tolerance to the reference face 12a and the window 14 so that an accuracy in processing of each of parts is strict and cost of the motor is increased.

FIGS. 2 to 6 show a face opposing type motor having first to sixth structures in accordance with one embodiment of the present invention.

The construction of the face opposing type motor will first be explained.

Figure 2:
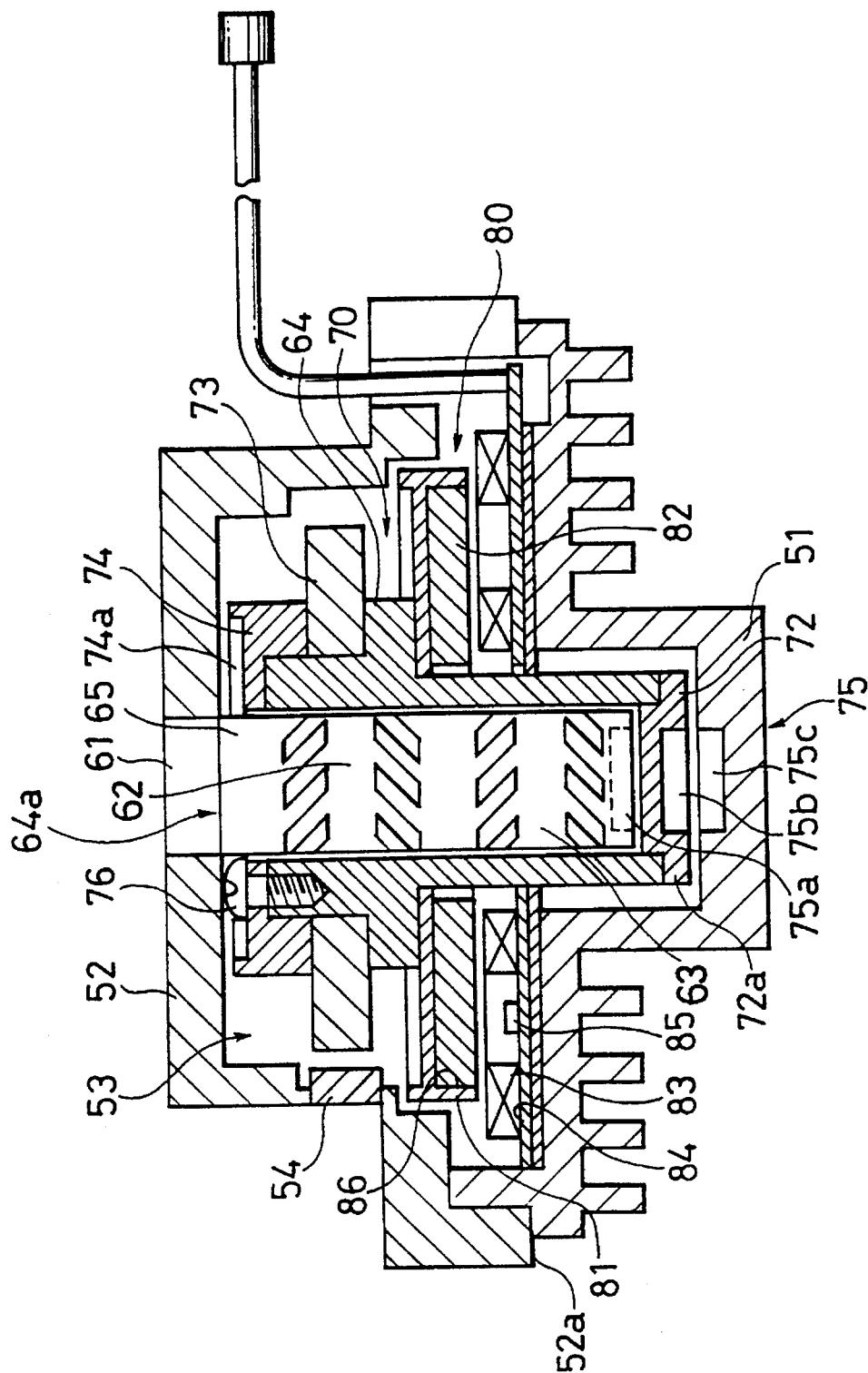
FIG. 2 is a cross-sectional view showing a face opposing type motor in accordance with one embodiment of the present invention.
Figure 3:
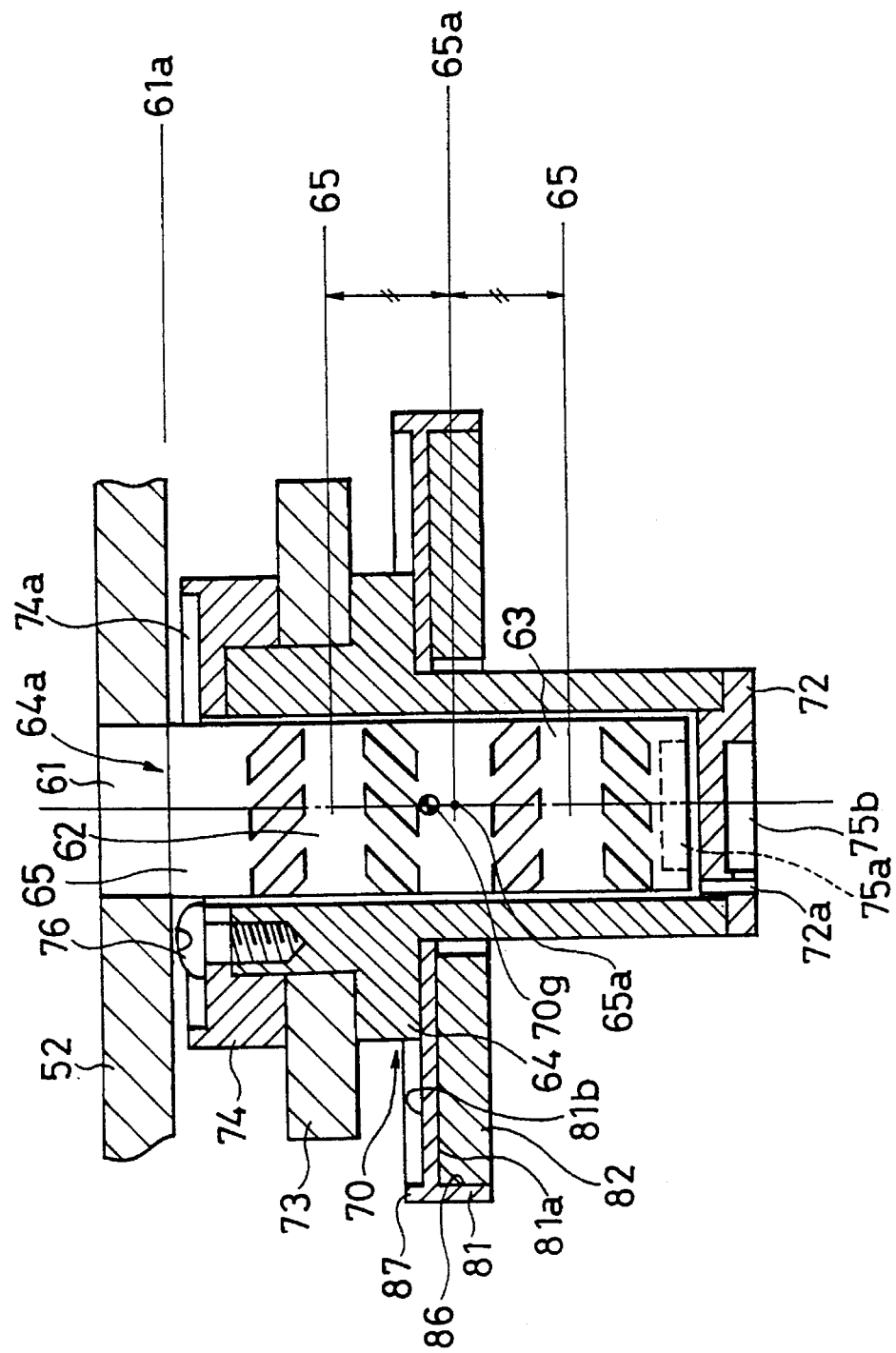
FIG. 3 is an enlarged cross-sectional view of a fixed shaft and a rotating body arranged in the face opposing type motor of the present invention.
Figure 4:
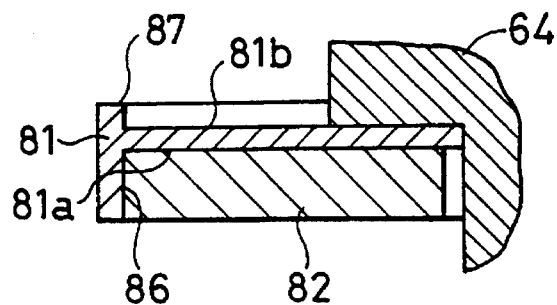
FIG. 4 is an enlarged cross-sectional view showing a main portion of the face opposing type motor in the present invention.

In FIGS. 2 to 4, a housing 51 and a casing 52 are integrally fitted to each other so as to form a closed chamber 53 within an internal portion between the housing 51 and the casing 52. The casing 52 has a reference face 52a for attaching the casing to an unillustrated optical system and a window 54 for deflection. A fixed shaft 61 is vertically fixed to this casing 52 such that one end of the fixed shaft 61 is free. The fixed shaft 61 is inserted into a hollow portion 64a of a hollow rotating shaft 64. A pair of upper and lower herringbone-shaped grooves 62 and 63 are formed on an outer circumferential face of the inserted fixed shaft 61. These grooves 62 and 63 are formed as recessed and projected portions for generating a dynamic pressure. This fixed shaft 61 has a diameter set such that the herringbone-shaped grooves 62 and 63 are spaced from an inner circumferential face of the hollow rotating shaft 64 at a predetermined bearing distance. The hollow rotating shaft 64 can be rotated with respect to the fixed shaft 61. When the hollow rotating shaft 64 is rotated, a dynamic pressure is generated as described later in cooperation with the herringbone-shaped grooves 62 and 63 and the hollow rotating shaft 64. Thus, the fixed shaft 61 and the hollow rotating shaft 64 are separated from each other so that a non-contact state is attained in a radial direction of the shafts. A dynamic pressure air radial bearing 65 is constructed by the herringbone-shaped grooves 62 and 63 of the fixed shaft 61 and the inner circumferential face of the hollow rotating shaft 64. It is sufficient to form the herringbone-shaped grooves 62 and 63 as recessed and projected portions for generating the dynamic pressure. Accordingly, the recessed and projected portions may be formed on the inner circumferential face of the hollow rotating shaft 64 instead of the outer circumferential face of the fixed shaft 61. The fixed shaft 61 and the hollow rotating shaft 64 constituting the dynamic pressure air radial bearing 65 are preferably formed by the same material such as aluminum, an aluminum alloy or stainless steel.

A cover 72, a polygon mirror 73, a mirror presser 74, a permanent magnet 75b, an attaching screw 76, a rotor yoke 81 and a rotor magnet 82 are attached to the hollow rotating shaft 64 so that these members are integrally rotated by rotating the hollow rotating shaft 64. These members and the hollow rotating shaft 64 constitute a rotating body 70. As shown in FIG. 3, a center 70g of gravity of the rotating body 70 is located in a position from an approximately central position 65a of the pair of herringbone-shaped grooves 62 and 63 of the dynamic pressure air radial bearing 65 to a fixed end 61a of the fixed shaft 61 in an axial direction of the fixed shaft 61. A small hole 72a is formed in the cover 72. This small hole 72a functions as an air damper for providing high damping characteristics in the axial direction with respect to a rapid vibration of the rotating body 70, etc. The mirror presser 74 has a balancing groove 74a for preventing rotation of the rotating body 70 from being unbalanced. However, in this embodiment, it is not necessary to especially dispose such a balancing groove.

A permanent magnet 75a is attached to the free end of the fixed shaft 61 and a permanent magnet 75c is attached to the housing 51. The permanent magnets 75a and 75c are set to be repulsive to the permanent magnet 75b. These permanent magnets 75a, 75b and 75c constitute a magnetic thrust bearing 75 having a repulsion type sandwich structure for setting an operating state of the rotating body 70 to a complete non-contact state in the axial direction.

Each of a rotor yoke 81 and a rotor magnet 82 is attached to the hollow rotating shaft 64 as a portion of the rotating body 70. A driving coil substrate 83 is attached to the housing 51. A face opposing type motor 80 is constructed by the rotor yoke 81, the rotor magnet 82, the driving coil substrate 83, a stator yoke 84 and a Hall element 85. This face opposing type motor 80 can rotate the rotor magnet 82 by an unillustrated driver portion disposed in the driving coil substrate 83, thereby rotating the rotating body 70. The rotor yoke 81 is made of stainless steel constituting an iron or magnetic material. The rotor magnet 82 is formed by a plastic magnet. Coefficients of thermal expansion of the rotor yoke 81, the rotor magnet 82 and a flange made of an aluminum alloy as in the above general flange 36 has the following relation.

Coefficient of thermal expansion of the rotor magnet 82>coefficient of thermal expansion of the aluminum alloy flange>coefficient of thermal expansion of the rotor yoke 81.

As shown in FIG. 4, a fitting portion 86 and a projected ring portion 87 for correcting an unbalanced portion of the rotor yoke 81 are integrally formed in an outer circumferential portion of the rotor yoke 81. The fitting portion 86 is closely fitted to an outer circumferential face of the rotor magnet 82. The projected ring portion 87 is connected to one axial end of the fitting portion 86. The fitting portion 86 is formed such that the outer circumferential face of the rotor magnet 82 is completely covered with the fitting portion 86. The fitting portion 86 holds the rotor magnet 82 to restrain the rotor magnet 82 from being expanded in a diametrical direction thereof by an increase in temperature of the rotor magnet and centrifugal force of the rotor magnet when the motor is continuously operated. The projected ring portion 87 is formed in the outer circumferential portion of the rotor yoke 81 and is projected from a yoke face 81b opposite to a yoke face 81a on a side of the rotor magnet 82. The rotor magnet 82 and the driving coil substrate 83 also function as a magnetic bearing to increase a bearing rigidity of the rotating body 70 in the axial direction thereof so that an axial position of the rotating body 70 is stabilized with respect to a disturbance or external force.

An operation of the face opposing type motor will next be described.

An electric current flows through the driving coil substrate 83 by the above driver portion so that the rotor magnet 82 is rotated and the rotating body 70 is thereby rotated. At this time, the herringbone-shaped grooves 62 and 63 of the fixed shaft 61 take a dynamic pressure generating action in which air existing in a clearance between the hollow rotating shaft 64 and the fixed shaft 61 is pressed toward a central portion of each of the herringbone-shaped grooves 62 and 63 in a rotational direction of the hollow rotating shaft 64. The rotating body 70 is supported by the magnetic thrust bearing 75 in a complete non-contact state in the axial direction. When a dynamic pressure of the air is equal to or greater than a predetermined pressure, the rotating body 70 completely floats from the fixed shaft 61 in the radial direction. Thus, the rotating body 70 attains a non-contact rotating state so that the rotating body 70 can be rotated at a high speed.

When the rotating body 70 is rotated at a high speed, the rotor magnet 82 tends to be expanded in its diametrical direction by an increase in temperature of the rotor magnet and centrifugal force thereof. However, in this embodiment, the fitting portion 86 of the rotor yoke 81 has a coefficient of thermal expansion smaller than that of the rotor magnet 82 and is closely fitted to the outer circumferential face of the rotor magnet 82. Therefore, the thermal expansion of the rotor magnet 82 is restrained by the fitting portion 86. Accordingly, an increase in unbalanced rotation of the rotating body 70 can be prevented so that an accuracy in rotation of the face opposing type motor 80 is improved.

The outer circumferential face of the rotor magnet 82 is completely covered with the fitting portion 86 of the rotor yoke 81 constructed by a magnetic material. Accordingly, it is possible to prevent magnetic fluxes from being leaked to the casing 52 and the housing 51 so that an eddy current loss caused by a rotating magnetic field of the rotor magnet 82 is reduced. Therefore, it is possible to improve driving efficiency of the face opposing type motor 80. When the rotor yoke 81 is made of stainless steel as a magnetic material, rust preventive processing can be omitted so that processing cost of parts of the rotor yoke 81 is reduced.

The center 70g of gravity of the rotating body 70 is located on a side of the fixed end 61a of the fixed shaft 61 from the approximately central position 65a of the dynamic pressure air radial bearing 65. Accordingly, no rotation of the rotating body 70 is easily influenced by vibration of the fixed shaft 61 so that a vibrational rotation of the rotating body 70 caused by the vibration of the fixed shaft 61 is restrained. Therefore, it is possible to improve an accuracy in rotation of the face opposing type motor 80 and a quality of this face opposing type motor.

The fixed shaft 61 is fixed to the casing 52 having the attaching reference face 52a and the window 54 for deflection. Accordingly, it is possible to prevent the fixed shaft 61 from being inclined with respect to the attaching reference face 52a and the window 54 for deflection and reduce an accumulative error in assembly accuracy of the motor. Therefore, an allowable range of each of sizes of parts is increased so that processing cost of the parts can be reduced.

Figure 5:
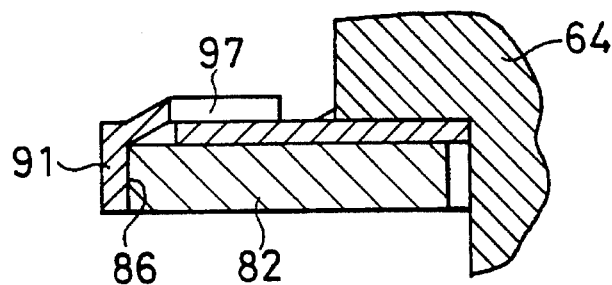
FIG. 5 is an enlarged cross-sectional view showing another constructions of a rotor yoke and a rotor magnet in the face opposing type motor of the present invention.
Figure 6:
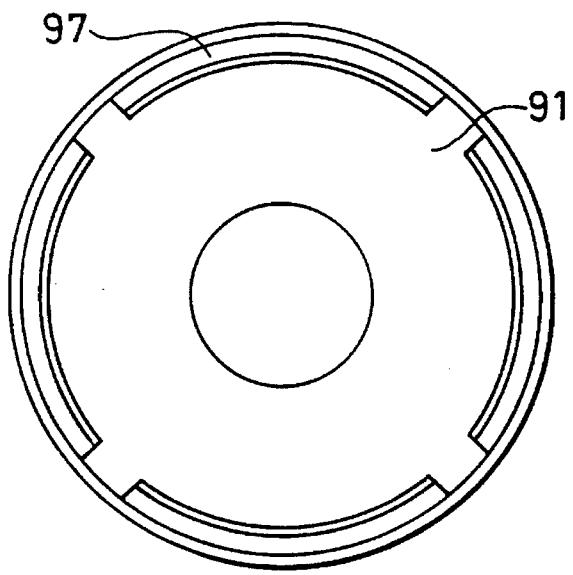
FIG. 6 is a plan view of the rotor yoke shown in FIG. 5.

In this embodiment, the projected ring portion 87 for correcting an unbalanced portion of the rotor yoke 81 is integrally formed with the rotor yoke 81. However, as shown in FIGS. 5 and 6, processing cost of the rotor yoke can be reduced if the rotor yoke is constructed by a rotor yoke 91 having intermittent projected portions 97 spaced from each other by press working in a circumferential direction. In FIG. 6, four projected portions 97 are formed, but it is sufficient to form two or more intermittent projected portions spaced from each other in the circumferential direction. In this embodiment, the casing 52 has both the attaching reference face 52a and the window 54 for deflection, but may have only one of the attaching reference face 52a and the window 54. Further, in the polygon scanner shown as one example, the polygon mirror as a rotated body is attached to the hollow rotating shaft. However, the present invention is not limited to the polygon scanner, but can be applied to other driving devices of a hologram disk of a transmission type, etc. using a face opposing type motor.

As mentioned above, in accordance with a first structure of the present invention, the fitting portion fitted to an outer circumferential face of the rotor magnet is disposed in the rotor yoke so as to hold the rotor magnet by this fitting portion. Accordingly, it is possible to restrain the rotor magnet from being expanded in a diametrical direction thereof by an increase in temperature of the rotor magnet and centrifugal force of the rotor magnet when the motor is continuously operated. Therefore, a face opposing type motor having an excellent accuracy in rotation thereof can be provided. Further, since the rotor magnet is fixed by the rotor yoke, a flange for fixing the rotor magnet thereto can be omitted so that the number of parts can be reduced and manufacturing cost of the motor can be reduced.

In accordance with a second structure of the present invention, the outer circumferential face of the rotor magnet is completely covered with the rotor yoke constructed by a magnetic material. Accordingly, it is possible to prevent magnetic fluxes from being leaked to the casing and the housing so that an eddy current loss caused by a rotating magnetic field of the rotor magnet can be reduced. As a result, a face opposing type motor having an excellent driving efficiency can be provided.

In accordance with a third structure of the present invention, a center of gravity of the rotating body is located in a position from an approximately central position of recessed and projected portions for generating a dynamic pressure to a fixed end of the fixed shaft. Accordingly, a vibrational rotation of the rotating body caused by vibration of the fixed shaft can be restrained. As a result, it is possible to provide a reliable face opposing type motor having an excellent accuracy in rotation thereof.

In accordance with a fourth structure of the present invention, the fixed shaft having a strict accuracy in inclination thereof with respect to an attaching reference face and a window for deflection is fixed to the casing having the attaching reference face or the window for deflection. Accordingly, accumulative errors in processing and assembly accuracies of the motor can be reduced so that it is possible to provide a face opposing type motor having an excellent quality and cheaply manufactured.

In accordance with a fifth structure of the present invention, intermittent projected portions for correcting an unbalanced portion of the rotor yoke are integrally formed in an outer circumferential portion of the rotor yoke in a circumferential direction thereof such that the projected portions are projected onto a yoke face opposite to a yoke face facing the rotor magnet. Accordingly, the projected portions can be formed simply and integrally by press working, etc. so that processing cost of the rotor yoke can be reduced.

In accordance with a sixth structure of the present invention, the rotor yoke for holding the rotor magnet is made of stainless steel as an iron or magnetic material and the rotor magnet is formed by a plastic magnet. Accordingly, a coefficient of thermal expansion of the rotor yoke is set to be smaller than that of the rotor magnet so that it is possible to reliably restrain the rotor magnet from being expanded by this rotor yoke. Further, when the rotor yoke is made of stainless steel as a magnetic material, rust preventive processing can be omitted so that cost of the motor can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A face opposing type motor comprising: a fixed shaft;
    a hollow rotating shaft in which said fixed shaft is inserted forming a non-contact bearing device in association with said fixed shaft, said hollow rotating shaft including a tubular portion extending in a rotational axis direction of said motor and a ring portion coaxially and integrally fixed to an outer circumferential face of said tubular portion at an inner circumferential face thereof, said hollow rotating shaft having a first coefficient of thermal expansion;
    an annular magnetic rotor yoke coaxially fixed to said hollow rotating shaft and contacting both said tubular portion and said ring portion at an inner circumferential part thereof, said rotor yoke including an annular disk portion extending in a radial direction of said hollow rotating shaft and an annular fitting portion projecting from an outer circumferential edge of said disk portion in a longitudinal axial direction of said hollow rotating shaft, said rotor yoke having a second coefficient of thermal expansion which is less than said first coefficient of thermal expansion;
    an annular disk-shaped rotor magnet held by said rotor yoke so as to be fitted by said fitting portion at an outer circumferential face thereof while contacting said disk portion at one flat surface thereof, said rotor magnet having a third coefficient of thermal expansion which is greater than the first coefficient of thermal expansion; and
    a driving base coil having a face opposed to said rotor magnet for driving said hollow rotating shaft in association with said rotor magnet.

2. A face opposing type motor as claimed in claim 1, wherein the outer circumferential face of said rotor magnet is completely covered with said rotor yoke.

3. A face opposing type motor as claimed in claim 1, wherein said non-contact bearing device has recessed and projected portions for generating a dynamic pressure and formed in one of the fixed shaft and the hollow rotating shaft, and a center of gravity of a rotating body including said hollow rotating shaft is located in a position from an approximately central position of the recessed and projected portions to a fixed end of the fixed shaft in an axial direction of the fixed shaft.

4. A face opposing type motor comprising:

a fixed shaft;

a hollow rotating shaft in which said fixed shaft is inserted forming a non-contact bearing device in association with said fixed shaft, said hollow rotating shaft including a tubular portion extending in a rotational axis direction of said motor and a ring portion coaxially and integrally fixed to an outer circumferential face of said tubular portion at an inner circumferential face thereof, said hollow rotating shaft having a first coefficient of thermal expansion;

an annular magnetic rotor yoke coaxially fixed to said hollow rotating shaft and contacting both said tubular portion and said ring portion at an inner circumferential part thereof, said rotor yoke including a first part extending in a radial direction of said hollow rotating shaft and a second part, attached to the first part which extends from the first part at an angle, projecting from an outer rotor yoke having a second coefficient of thermal expansion which is less than said first coefficient of thermal expansion;

an annular disk-shaped rotor magnet held by said rotor yoke so as to be fitted by said second part at an outer circumferential face thereof while contacting said disk portion at the first part, said magnet having a third coefficient of thermal expansion which is greater than the first coefficient of thermal expansion; and a driving base coil having a face opposed to said rotor magnet for driving said hollow rotating shaft in association with said rotor magnet.

5. A face opposing type motor as claimed in claim 1, wherein said non-contact bearing device has a magnetic thrust bearing arranged on a side of a housing attaching said driving base thereto, and one end of said fixed shaft is fixed to a casing for housing said rotating body in combination with the housing.

6. A face opposing type motor according to claim 4, wherein said angle that the second part of the rotor yoke extends from the first part of the rotor yoke is 90°.

7. A face opposing type motor as claimed in claim 1, wherein intermittent projected portions for correcting an unbalanced portion of the rotor yoke are integrally formed in an outer circumferential portion of said rotor yoke in a circumferential direction thereof such that the projected portions are projected onto a yoke face opposite to a yoke face facing said rotor magnet.

8. A face opposing type motor comprising:

a rotor yoke fixed to a hollow rotating shaft disposed in a non-contact bearing device;

the non-contact bearing device having a fixed shaft inserted into the hollow rotating shaft;

a rotor magnet held by the rotor yoke; and a driving base coil having a face opposed to the rotor magnet;

wherein said rotor yoke has a first part which is perpendicular to an axis of said hollow rotating shaft and a second part, attached to said first part, which extends from said first part at an angle; and wherein said second part contacts an outer circumferential portion of said rotor magnet such that a rotation of said hollow rotating shaft causes said rotor magnet to rotate and a centrifugal force from the rotation of said rotor magnet forces said outer circumferential portion of said rotor magnet against said second part of said rotor yoke and an orientation of said second part which results from said angle holds the rotor magnet.

9. A motor according to claim 8, wherein:

said rotor magnet has a coefficient of thermal expansion which is greater than a coefficient of thermal expansion of said rotor yoke.

10. A motor according to claim 9, wherein:

said rotating shaft has a coefficient of thermal expansion which is less than the coefficient of thermal expansion of said rotor magnet and greater than the coefficient of thermal expansion of said rotor yoke.

11. A face opposing type motor according to claim 8, wherein said angle that the second part of the rotor yoke extends from the first part of the rotor yoke is 90°.

* * * * *